May 30, 1939.　　　A. S. EDMONDS　　　2,160,308
BALL TRANSMISSION MECHANISM
Filed Sept. 6, 1934　　　2 Sheets-Sheet 1

INVENTOR.
Asbury S. Edmonds
BY C. P. Goepel
his ATTORNEY.

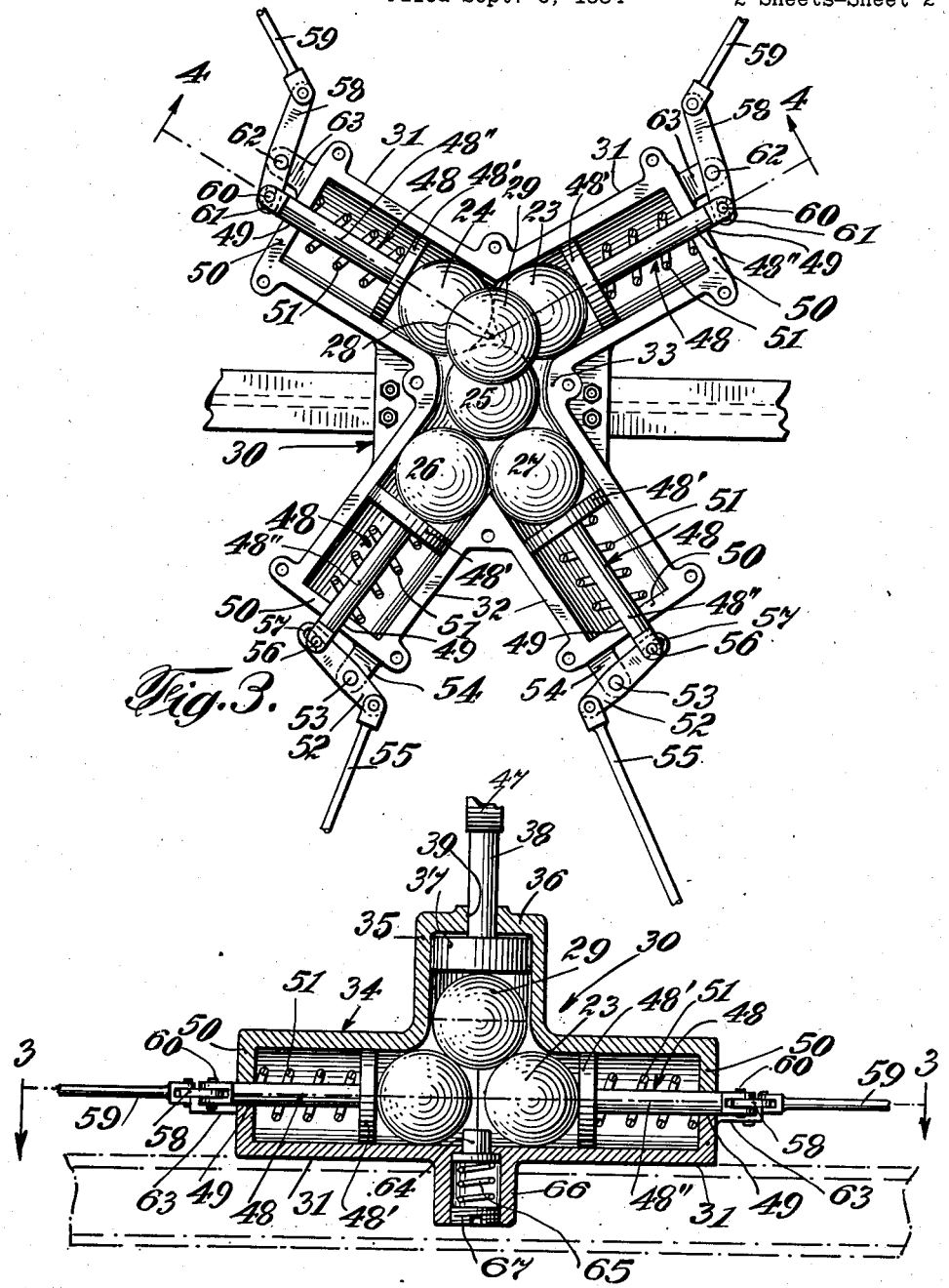

Patented May 30, 1939

2,160,308

UNITED STATES PATENT OFFICE 2,160,308

BALL TRANSMISSION MECHANISM

Asbury S. Edmonds, Brooklyn, N. Y.

Application September 6, 1934, Serial No. 742,919

14 Claims. (Cl. 188—204)

This invention relates generally to a transmission and more particularly to a ball transmission mechanism through the agency of which to transmit to a number of parts which are to be actuated, operating force derived from a single operating element.

The particular mechanism illustrated and described in this application has been devised in particular as a service brake transmission and equalizer for a four-wheel motor vehicle, and I desire to make it understood that in thus illustrating a particular example of my invention devised for the particular purpose indicated, I have not intended to limit the broader aspects of the invention to an arrangement adapted for that particular purpose. The mechanism of my invention involves principles of general application which may be variously adapted and modified for the transmission and equalization of forces. Therefore it is my intention to cover in some of the broader claims hereunto appended these principles in any modifications of construction and design in which they may be embodied, as well as to cover the particular adaptation of such principles herein illustrated for the particular purpose above indicated. The mechanism set forth in my companion application, Serial No. 128,253, filed February 27, 1937, for Transmission mechanism, is an improvement over the present application.

More specifically considered, the mechanism of the present invention includes a ball transmission assembly having a master ball disposed to displace a set of associated balls arranged for displacement in diverging directions for transmitting movement to transmission lines or branches severally connected with an actuable element which is to be operated from the operation of the master ball. The ball assembly is arranged in a housing suitably formed or furcated to accommodate the working ball elements and other parts of the branch transmission lines. The purpose of the assembly and arrangement is to provide simple, practical and efficient means whereby to transmit operating force to a number of parts, for instance to the four brake shoes of a motor vehicle, from a single prime mover, for instance, the brake pedal of a motor vehicle.

A further object of the novel arrangement and assembly is to effect an equalization in the braking force in such manner that the amount of braking force exerted upon the two rear brake drums will be the same or substantially the same, and similarly that the amount of braking force made upon the front brake drums will be the same or substantially the same. In this connection, also, provision is made whereby greater braking force may be exerted upon the rear drums than upon the front drums; and if it should be desired, or if the character or type of the particular vehicle should make it necessary or desirable, such differences in applying braking force may be reversed, i. e., a greater braking force may be exerted upon the front brake drums than upon the rear brake drums, in any desired proportion.

The nature of the general principles and objects above referred to, as well as other and additional objects and advantages, and the manner in which they may be embodied in concrete form and means, are explained in the following detailed description of the particular mechanism herein illustrated as an example, and to which reference is now directed.

In the drawings, in which similar characters of reference indicate corresponding parts throughout the several views;

Fig. 3 is a top plan view of the mechanism of the invention, the top or cover portion of the housing having been removed, this view being taken on the line 3—3 of Fig. 4; and Fig. 4 is a vertical section taken on the line 4—4 of Fig. 3.

Figure 1:
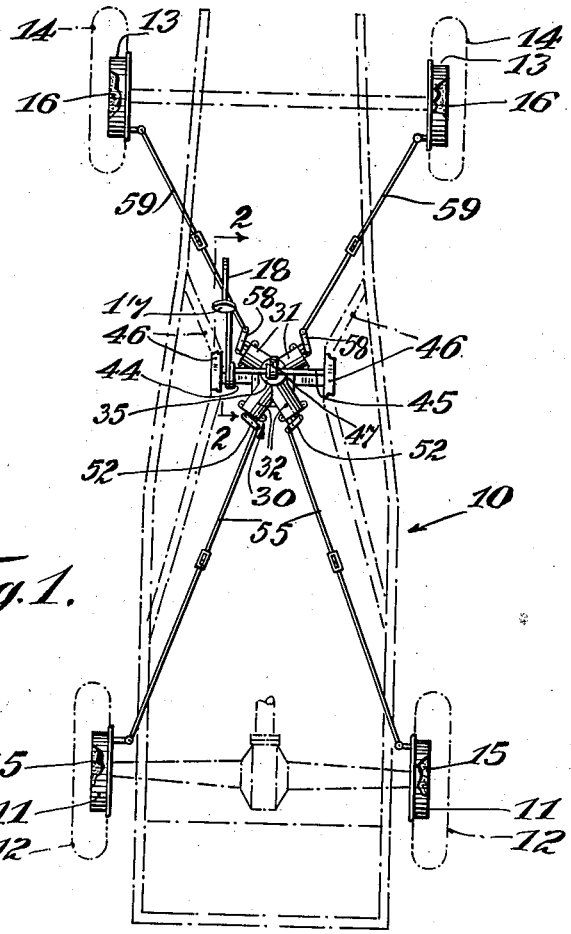
Fig. 1 is a top plan view, more or less diagrammatical in character, of a motor vehicle chassis embodying my invention.
Figure 2:
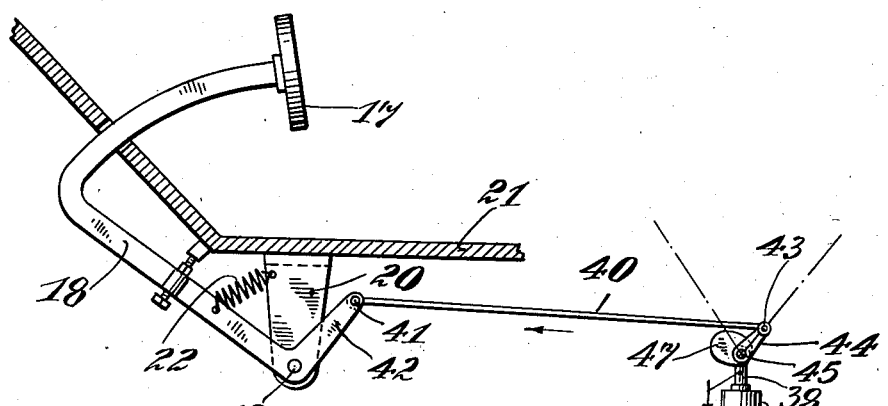
Fig. 2 represents a fragmentary sectional side elevation on the line 2—2 of Fig. 1.

Referring now to the accompanying drawings, and first to Fig. 1, wherein for purposes of illustration I have shown an exemplification of my invention in connection with a motor vehicle, 10 denotes the chassis, 11 the rear brake drums associated with the rear wheels 12, and 13 the front brake drums for the wheels 14. The illustrated drums are of the internal type and the usual cooperating brake shoes for the rear drums are indicated at 15 while those for the front drums are indicated at 16. A brake pedal is represented at 17 and this device, which in the present embodiment of my invention serves as the prime mover for my transmission mechanism, has its long lever portion 18 pivoted at 19 to a fixed support 20 below the floor board 21 and is normally maintained by pull spring 22 in position to be actuated by foot power in a well-known manner.

The transmission of my invention comprises a set of ball elements maintained within a suitable housing in coacting power transmitting relation by spring urged devices which by themselves serve as parts of branch transmission lines, inasmuch as in addition to maintaining the ball elements in proper transmitting relation at all times, these devices also receive the power or force transmitted by the ball elements and in turn serve as means for passing the power or force received thereby, to the next succeeding parts in their respective branch lines.

As shown in Fig. 3 of the present exemplification, the set of ball transmission elements includes the balls 23, 24, 25, 26 and 27, all disposed within the housing in a common horizontal plane, with the balls 23, 24 and 25 arranged in surface contact with each other about a common perpendicular center indicated at 28. The two remaining balls 26 and 27 in the common horizontal plane are each shown in surface contact with the ball 25. Included also in the set of ball transmission elements is a ball 29 which is disposed in a central position upon and between the three balls 23, 24 and 25, being seated thereon in the central bight formed by the adjacent spherical surfaces of the supporting balls so that its perpendicular diameter will be in alignment with the common perpendicular center line 28. This master ball 29, when thus resting centrally upon the three balls, has floating capability, not being fixed but loosely resting for free rotation and movement in any direction, and from this resting or floating position it may be moved downward under force in central alignment with the common variable perpendicular line 28 so as to forcibly push the three balls below it in divergent directions.

In the present exemplification, the housing for the ball elements comprises a body 30 formed or provided with four substantially horizontal branches corresponding with the number of brake mechanisms to be operated. Two of the branches both indicated by the numeral 31, may be referred to as front branches as they contain the working parts for operating the brakes of the front wheels, while the other two branches, both indicated by the numeral 32, may be termed rear branches, their purpose being to accommodate the working parts which operatively connect with the brakes for the rear wheels. As shown in Fig. 3, these front and rear branches diverge from a central neck-like or connecting portion 33 with which they are in open communication, all the branches as well as said connecting neck portion being of tubular form. In using my ball transmission in connection with an automobile, it is desirable to dispose the housing centrally on the longitudinal center line of the automobile and in a transverse plane relatively close to, though rearwardly of, the transverse plane in which the brake pedal lies, as shown in Fig. 1.

The upper portion or cover 34 of the housing is made with an upwardly extending tubular branch or portion 35 which encases the master ball 29, though with suitable clearance to permit the free floating activity of this ball. Within the tubular branch 35 and dipsosed slidably between the master ball 29 and the top or closed end 36 of this branch is a plunger 37 the stem 38 of which extends through a suitable opening or bushing 39 provided for the purpose in the closed end 36. The plunger 37 when actuated in a downward direction, moves the master ball 29 downward and hence causes the displacement of the three balls 23, 24 and 25 in divergent directions from the common center line 28.

Now, the downward movement of plunger 37 is effected from the depressing or brake actuating movement of brake pedal 17. For achieving this end, any suitable mechanical transmission may be provided between the brake pedal and the plunger. In the present exemplification, the means shown for this purpose comprises a pull rod 40, one end of which is pivotally connected at 41 with short arm 42 of brake pedal lever 18. The opposite end of rod 40 is pivoted at 43 to the end of crank arm 44 which is rigid with a transversely extending shaft 45 suitably mounted for rocking movement in frame parts 46 of the chassis. The rock shaft 45 carries an eccentric cam 47, the periphery of which is in contact with the top end of plunger stem 38. Under this arrangement each actuation of the brake pedal will cause a downward movement of the master ball for displacing the three balls under it.

From an inspection of Fig. 3, it will be observed that the balls 23 and 24 are disposed at the beginnings of their respective tubular branches so as to be displaced outwardly therein from the center line 28. It will also be observed that the ball 25 is similarly displaced in the neck portion 33 outwardly from said center line, and that the balls 26 and 27 are disposed at the beginnings of their respective tubular branches so as to be displaced outwardly therein away from the neck portion and by the displacement movement of the ball 25. The ball elements are kept in proper coacting surface contact ready for instant displacement by suitable spring urged plunger devices 48 operatively disposed in the tubular branches. The plunger device 48 in each tubualr branch comprises a head 48' for engaging the ball disposed at the beginning of the branch and a stem 48" which extends outwardly through and has working fit in an aperture 49 in the closed end 50 of the tubular branch. Coiled around each plunger stem is a spring 51 which is imprisoned between the plunger head and the closed end of the tubular branch. Levers 52, which are pivoted at 53 intermediate their length to ears 54 fixed to the rear tubular branches 32, pivotally connect the outer ends of the plunger devices associated with these tubular branches with pull rods 55 the opposite ends of which are operatively connected with the brake shoes 15 associated with the rear brake drums 11. The pins 56 which connect the plunger stems with the levers 52 work in suitable slots 57. So, also, the plungers associated with the front tubular branches 31 are pivotally connected by levers 58 with pull rods 59 which in turn are operatively connected with the brake shoes 16 associated with the front brake drums 13. Said levers 58 are connected with the plunger stems by pins 60 which work in slots 61 and they are pivoted intermediate their length at 62 on ears 63 fixed to the tubular branches.

With this construction and arrangement, the spring urged plunger devices not only maintain the ball elements in proper assembly relation for instant displacement on the actuation of the brake pedal, but they receive the displacement movement of the balls with which they contact and transmit such movement to the intermediately pivoted levers which operate the rods for applying the brakes. It will be evident that under each actuation of the brake pedal, the three balls 23, 24, 25 will be displaced with equal transmitting force, and also that the balls 26 and 27 will be displaced with equal transmitting force though the displacement force of each thereof will be less than that of each of the other three mentioned balls. After each brake applying actuation, the expansion action of the springs 51 re-positions the plungers and therewith connected parts and causes a re-positioning of the ball elements, and as the three balls 23, 24 and 25 under the re-positioning action are shoved along convergent paths toward the common center line 28, the master ball 29 will be pushed upwardly to occupy its floating position upon the adjacent spherical surfaces of said three balls. In Fig. 4, I show a safety plunger 64 upon a spring 65 arranged in a tubular housing part 66. This spring is imprisoned between a screw plug 67 and the plunger 64, and will be compressed by the thrust of the master ball 29 upon the plunger 64, in the event the master ball is moved substantially all the way down between the three balls into the horizontal plane thereof. This safety device which, when it is contacted by the master ball 29, yieldingly resists the further downward movement thereof, serves to prevent the master ball from assuming a wedged or locked dead center position between the three balls which contact with it.

The leverage of the two rear levers 52 is identical and as the balls 26 and 27 receive the same amount of pushing force from ball 25, the two rear wheel brakes are applied with the same or substantially the same amount of pulling force. So, also, the two front wheel brakes are applied with equal or substantially equal pulling force, the front leverages being equal and the balls 23 and 24 receiving the same amount of pushing force from the master ball 29. It is, therefore, characteristic of this invention, that the brakes for the two rear wheels will be applied with substantially equal braking force, and that the brakes for the two front wheels will be applied with substantially equal braking force.

Practically all of the conventional types of motor vehicles have a rear wheel drive. For these types, it may be desirable to exert a greater braking action upon the rear wheel drums than upon the front wheel drums. To achieve this result with the present invention, the rear levers 52 can be so fulcrumed that their pushing sides and pulling sides will have a ratio of about three to two, while the corresponding sides of the front levers 58 may have a ratio of two to four. For illustration purposes only, the levers shown in Fig. 3 of the drawings are fulcrumed to furnish about the ratios mentioned. It will be evident that without any change in the assembly of ball elements, these ratios may by changes in the leverage be changed so as to simultaneously obtain as between the rear wheel brakes and the front wheel brakes the desired differences in the application of braking force.

In practice, in order that the balls of the assembly may move easily and smoothly and revolve freely, the housing may be filled with suitable oil or grease lubricant, in which event the housing and its parts including openings for working parts should be so constructed or sealed as to prevent the loss of lubricant.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations, modifications and adaptations as come within the scope of the appended claims.

I claim:

1. A ball transmission means interposed between a pedal operating part and the four several brakes associated with the four wheels of a vehicle, comprising a housing having ball accommodating portions corresponding in number with the wheels and extending from an intercommunicating portion, contiguously associated balls disposed one in each of said portions, a master ball arranged to be actuated from said pedal operating part, said portions being so related that said master ball rests centrally upon the adjacent surfaces of at least three other balls severally disposed in different portions and said master ball adapted, when actuated, to act on said three balls and cause the displacement of all the balls in said portions, a spring urged plunger device in each portion abutting the ball therein and adapted on the displacement thereof to be yieldingly moved outwardly, and operating means connecting each plunger device with the corresponding brake whereby to actuate the corresponding brake on the actuation of the plunger device.

2. In transmission mechanism, a group of three transmission self-centering elements, means for maintaining the elements as a group in mutually centered relation about a common center line which is movable with the movement of such group, said means being so constructed and arranged as to permit relative movement of the group, and means for simultaneously displacing the elements of the group laterally outwardly from the common center line comprising a master mover having self-centering coaction with the elements for movement directly against the elements of the group in alignment with the common center line thereof, said mover also having floating movement with and by the group itself whereby at all times the master mover for its direct movement to be operatively aligned with the common center line of the group.

3. In transmission mechanism, a group of at least three transmission balls, means for maintaining the balls as a group in mutually centered relation in the same plane about a common center line which is movable with the movement of such group, said means being so constructed and arranged as to permit relative movement of the group, and means for simultaneously displacing the balls comprising a master mover having movement against the balls of the group in alignment with the common center thereof and also having floating movement with and by the group itself whereby at all times to be operatively aligned with the common center line of the group.

4. A ball transmission in which not less than three transmission balls are disposed in a common plane in mutually centered relation as a movable group having a common center line perpendicular to the common plane, means for acting upon the respective balls of the group whereby to move such group in the common plane, a movable master ball disposed in self-centering relation to the balls of the group for alignment with said common center line, means for maintaining the master ball in such self-centering coaction that as the group is moved in the common plane the master ball will be moved with it, and means for moving the master ball toward the common plane to effect lateral displacement of each of the balls from the center line.

5. In combination, a fixed casing having a central branch and at least three divergent branches extending outwardly therefrom, transmission displaceable elements individual to the divergent branches, disposed for outward movement therein and associated together in the central branch as a shiftable assembly, actuable power-receiving devices individual to the displaceable elements acting inwardly to maintain the elements in assembly, and a force distributing device floatingly arranged in respect of the casing and having cooperation with the assembly to act as a single applied force simultaneously on each of the transmission elements thereof for displacing the elements outwardly whereby to cause actuation of said actuable devices.

6. In transmission mechanism, the combination of a housing having a central tubular branch and three branches arranged radially with respect thereto, elements associated together in the central branch as an assembled group and each accommodated in a radial branch for outward displacement along said branch, a master transmission element floatingly associated with the central branch and adapted to act simultaneously on each of the three transmission elements of the group, the center of the master transmission element having alignment with the common center of the three transmission elements and said centers being shiftable together with the shifting of the group and the master transmission element, operating means for actuating the master transmission element, whereby to displace outwardly along said branches the three transmission elements, and actuable means individual to the three transmission elements arranged to be actuated thereby upon the outward displacement thereof, said means being effective to return the three transmission elements to their respective positions after each operation effected by the master transmission element.

7. In transmission mechanism according to claim 6, in which with at least one of the three radially arranged branches there are combined two converging branches forming thereby a junction, a secondary transmission element disposed in each of said converging branches at the junction and adapted to be displaced outwardly along said converging branches by the outward displacement of the impellable transmission element in that radial branch with which the branches are combined, and actuable means individual to each of the secondary transmission elements arranged to be actuated thereby upon the outward displacement thereof, said means being adapted to return the secondary transmission elements to their respective positions after each operation effected by the transmission element in said radial branch.

8. In a brake apparatus for vehicles, an operating lever whereby to cause operation of the brakes, a fixed casing having a central branch and having for each brake a branch extending outwardly from the central branch, an actuable power-receiving device associated with each outwardly extending branch and including means extending to, and connected with, its respective brake for operating the same, transmission displaceable elements movably disposed in the outwardly extending branches and normally urged inwardly thereof by said power-receiving devices to provide an assembled group of said elements in said central branch, and a force distributing device under control of said operating lever for operation thereby, said device being floatingly arranged in said central branch and having cooperation with the assembled group therein to act as a single applied force simultaneously on each of the transmission elements thereof for displacing the elements outwardly whereby to cause actuation of said actuable devices.

9. A transmission mechanism for automobiles having actuable power receiving devices and brake devices adapted to be moved by the power receiving devices, comprising a central group of three transmission balls spring-impelled by the power receiving devices into mutually centered relation as a movable group the common center line of which inherently accompanies the movement of the group, the group being movable by unequal forces exerted thereon by the power receiving devices, and means for simultaneously displacing each of the balls laterally from the common center line against the impelling values of the spring-impelled power receiving devices, whereby to actuate the latter, said means being freely floatable to coact with the three transmission balls in alignment with the common center line thereof so as to effect such displacement in any position to which the group is movable.

10. A transmission mechanism comprising a fixed container including a group of three converging branches, the inner ends of which merge together to form a common intercommunicating junction branch, a corresponding group of transmission rotatable elements associated in mutually centered relation in said junction branch and each disposed in a converging branch for outward displacement therein, means operating within the junction branch for simultaneously effecting outward displacement of the rotatable elements in their respective branches, power receiving devices actuable by the outward displacement of the rotatable elements, and brake devices adapted to be moved by the power receiving devices.

11. A transmission mechanism having a container including converging branches the inner ends of which merge together to form an intercommunicating primary junction branch and at least one of the first-named branches including other converging branches forming a secondary junction branch, transmission primary rotatable elements engaged in mutually centered relation in the intercommunicating branch and displaceable outwardly in the converging branches, secondary rotatable elements displaceable outwardly in the secondary junction branch and mutually centered with the primary element of one of the converging branches, means operating within the intercommunicating branch for effecting outward displacement of all of the rotatable elements, power receiving devices actuable by the outward displacement of the rotatable elements, certain of said lines extending from the primary rotatable elements in the converging branches not having the secondary junction branch, and certain of said lines extending from the secondary rotatable elements in the junction branches and parts individual to and adapted to be actuated by power receiving devices both from the converging branches and from the junction branches, and brake devices adapted to be moved by the said power receiving devices.

12. In combination with the respective brake devices for the several brakes of a motor vehicle, a housing having sections corresponding in number with the brake devices and converging to form a junction chamber, transmission balls movably disposed in the sections including a group of three balls in said chamber in mutually centered relation as a group, the common center line of which accompanies the movement of the group, power receiving devices connected with said brake devices, including terminals within the sections normally impelling the balls inwardly thereof and maintaining the group in the chamber in mutually centered relation, said lines adapted when having unequal impelling value to effect a movement of the group, a floatingly arranged master mover coacting with the group in said chamber and adapted to be moved by and with the movement of the group in constant alignment with said common center line, and operating means freely movable with respect to the housing for moving said master mover directly against the group for simultaneously displacing the balls of the group outwardly from the common center line against the terminals whereby to operate the power receiving devices.

13. In combination, a plurality of three elements adapted to be moved to and fro under restricted movement in respect to and substantially at right angles to a shiftable common center line which accompanies the movement of the group of said three elements, actuable power receiving devices adapted to be moved by said elements, brake devices adapted to be moved by said power receiving devices, and a single force distributing device having cross-sections in circular contour of successively diminishing diameters and having a center line, the three elements being disposed in triangular relationship and making a three point contact with said force distributing device at points normally substantially equally disposed in respect to the common center line, the transposition of one of said contact points out of the aforesaid normal position causing the distributing device to follow it, while maintaining contact with the other two elements, whereby a self compensatory action of the distributing device in respect to all three elements takes place.

14. In combination, a plurality of three elements adapted to be moved to and fro under restricted movement in respect to and substantially at right angles to a shiftable common center line which accompanies the movement of the group of said three elements, actuable power receiving devices adapted to be moved by said elements, brake devices adapted to be moved by said power receiving devices, a single force distributing device having cross-sections in circular contour of successively diminishing diameters and having a center line, and means for floatingly engaging the force distributing device with said three elements for shifting at all times the center line of said device coincidently with the shiftable center line of the three elements, said device having cooperation with said elements to act as a single applied force simultaneously on each of the three elements for displacing the elements divergently in respect to said common center line the three elements being disposed in triangular relationship and making a three point contact with said force distributing device at points normally substantially equally disposed in respect to the common center line, the transposition of one of said contact points out of the aforesaid normal position causing the distributing device to follow it, while maintaining contact with the other two elements, whereby a self compensatory action of the distributing device in respect to all three elements takes place and causes actuation of said actuable devices and said brake devices.

ASBURY S. EDMONDS.